Figure 1:
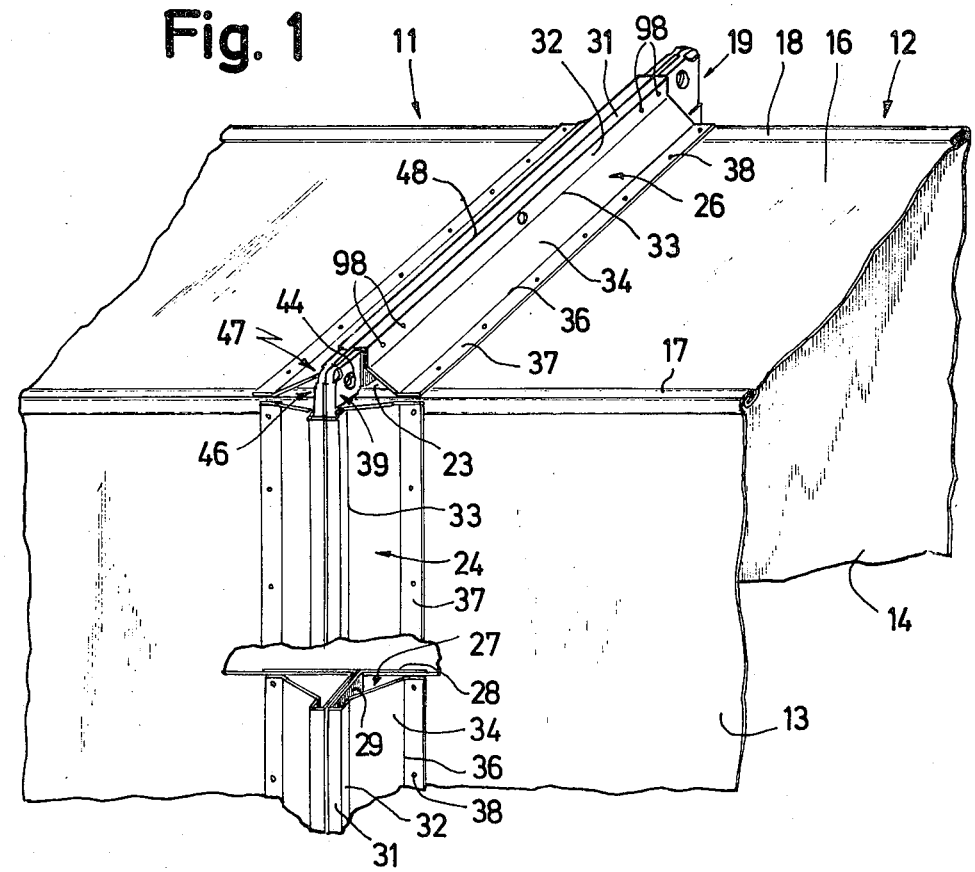

United States Patent [19]
Mez

[11] 3,923,326
[45] Dec. 2, 1975

[54] FLANGE CONNECTION
[76] Inventor: Georg Mez, Gartenstrasse 30A, 7416 Gonningen, Germany
[22] Filed: Feb. 4, 1974
[21] Appl. No.: 439,386

[52] U.S. Cl. ............................... 285/363; 285/424
[51] Int. Cl.² ........................................ F16L 17/00
[58] Field of Search ............ 285/424, 364, 363, 406

[56] References Cited
UNITED STATES PATENTS

| | | | |
|---|---|---|---|
| 1,935,690 | 11/1933 | Zolk | 285/424 X |
| 3,199,901 | 8/1965 | Jeppsson | 285/364 |
| 3,712,650 | 1/1973 | Mez | 285/424 |
| 3,811,714 | 5/1974 | Pintard | 285/424 |

Primary Examiner—Dave W. Arola

[57] ABSTRACT

A flange connection for rectangular air-conditioning ducts has four hollow open-ended frame members which fit rigidly on the ends of the duct walls. The legs of separate elbows fit into the openings. Spacers are provided at the corners of the elbows on offset plates. The spacers cause the sealing surfaces of opposite frame members to be pushed towards a sealing plane when nut and bolt fastening means press opposed elbows towards each other.

11 Claims, 10 Drawing Figures

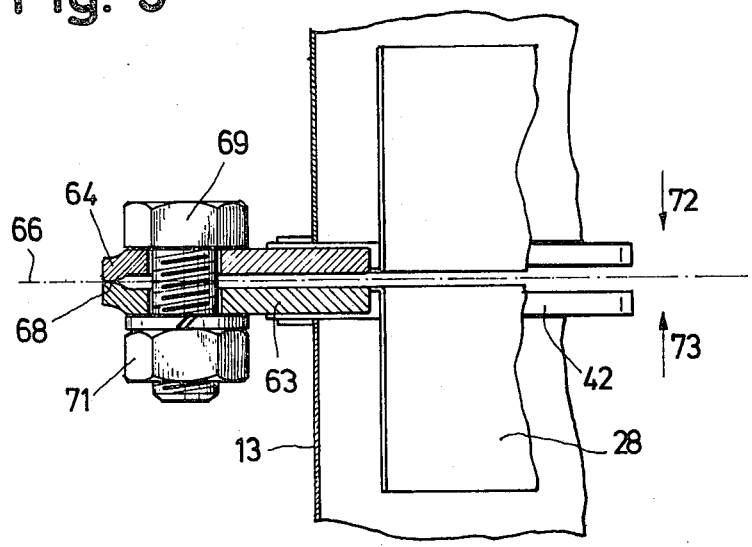
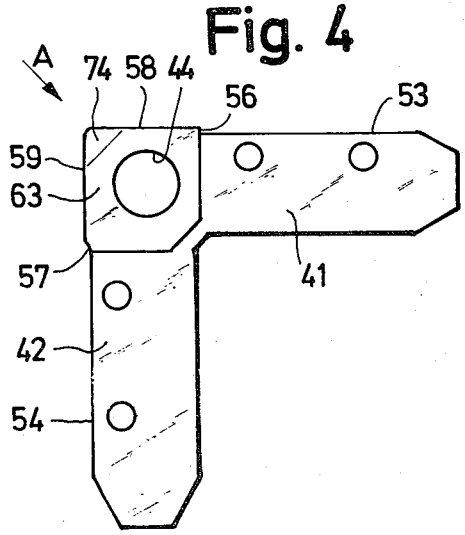
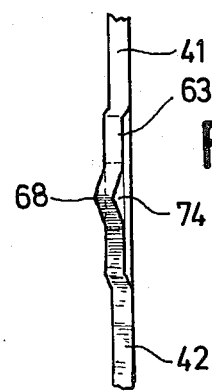

FLANGE CONNECTION

This invention relates to a flange connection for rectangular air conditioning ducts, with a flange exhibiting four frame pieces of sheet metal and hollow sections at the ends, capable of being pushed on the free end of a duct and to be connected there rigidly with the latter, with an elbow several millimeters in width, exhibiting two legs and a center plate connecting the two legs, and the latter inserted into one of the adjacent hollow sections each.

Such air conditioning ducts are frequently of large dimensions. When the screws inserted through the elbows are tightened, the contact pressure is not equally distributed over the length of the hollow sections. This means that gaps may result between hollow sections of adjacent air conditioning ducts situated opposite from each other. This will be true of course also if the air conditioning duct with its flange strikes against the frame of a machine, if the construction element following the air conditioning duct is an outside sealing grille, or the like.

Many different methods are being employed now in order to prevent the formation of gaps:

1. In the section between the corner elbow pieces, the flanges are pulled towards each other by means of screws. This means lots of drilling work, additional expenditure in screws, and additional tightening of a large number of screws. If the flange is situated too close to a wall or ceiling, it becomes impossible afterwards to do any drilling or screwing. The protective coating will be damaged at the drilling sites and corrosion may set in.
2. The larger the gap, the thicker is the sealing material used, thus enabling the packing to fill out the gaps. It is usually necessary to paste several layers of sealing material on top of each other. In the long run, packings are, however, suited only for proofing and are unsuitable for replacement of missing material. If the sealing material is insufficiently compressed, it may occur especially in high-pressure air conditioning ducts, that they are pressed towards the outside.
3. The hollow sections are rolled in such a way that they are slightly curved, with the center of curvature on the side averted from the sealing surface. Such a hollow section projects then more in the center than in the corner areas, with the result that the sealing pressure in the center is still sufficient when the corner screws are tightened. However, this step is difficult as the curvature of the hollow sections may be only of such a slight extent that it cannot be perceived with the naked eye. It only amounts to several millimeters to the meter. If the hollow sections are stretched excessively in one direction during the transportation, they will no longer have the correct curvature. If the curvature is too large, the hollow sections will again "open their mouth" in the center and if it is too slight the contact pressure in the center will possibly be insufficient. The curvature of the hollow sections must also remain intact when they are fastened to the air conditioning duct. This necessitates considerable caution during the spot welding process.

It is the object of the invention, to prevent gaping of he flange connections by essentially quite simpler neans.

Pursuant to the invention, this task is solved by means of the following features:

a. A spacer, consisting of a material which maintains an effective height during contact pressures exerted by the elbow pieces.
b. The spacer has a height sufficient to press the hollow sections with their sealing surfaces in the direction of the sealing plane and to keep them in this position.
c. The spacer has its contact surface facing towards the sealing plane.
d. The spacer has its contact surface in the corner area of the elbow piece.

Additional advantages and features of the invention emerge from the following description of preferred typical drawings.

Figure 2:
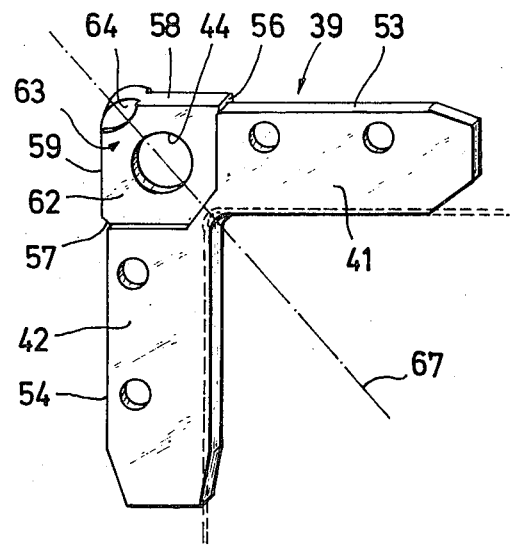
Figure 6:
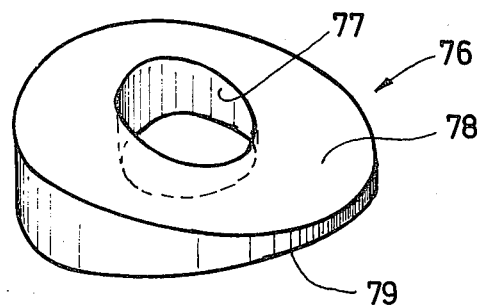
Figure 7:
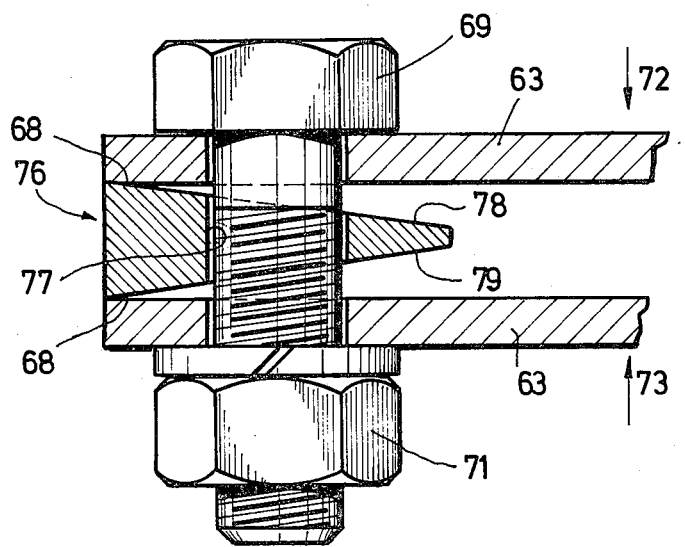
Figure 8:
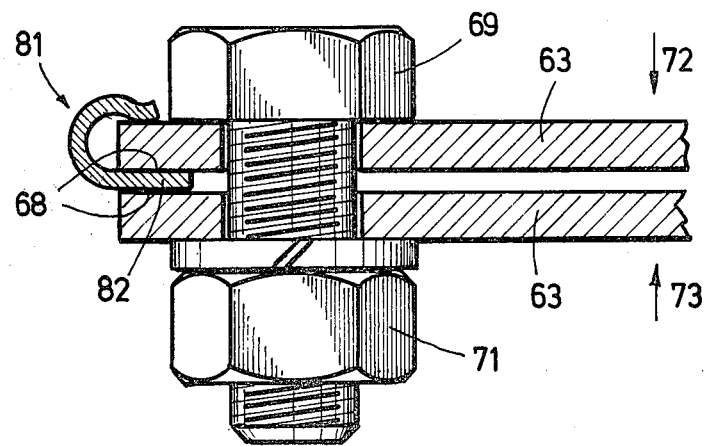
Figure 9:
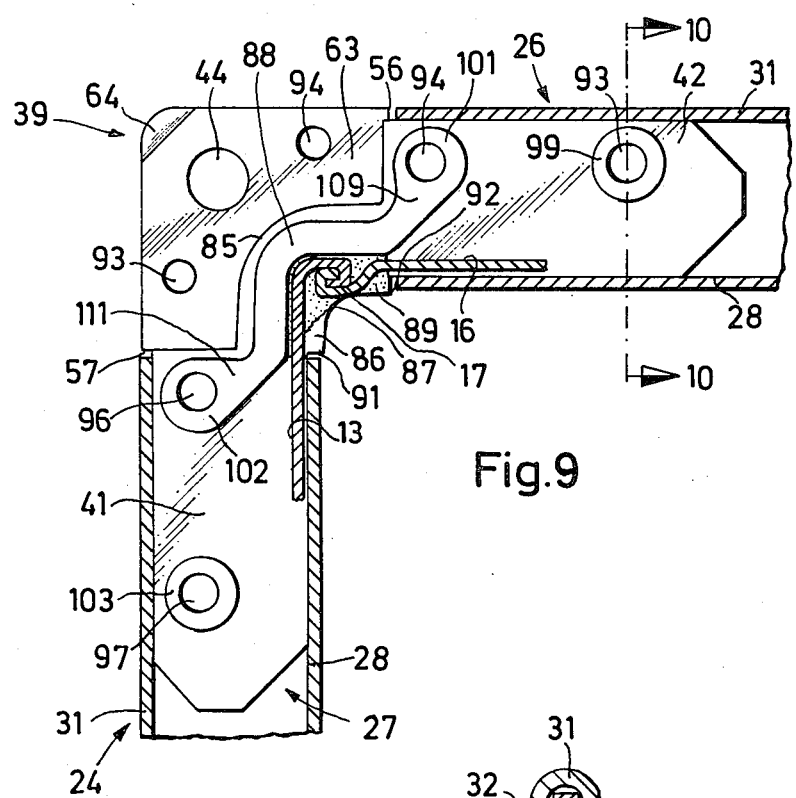
Figure 10:
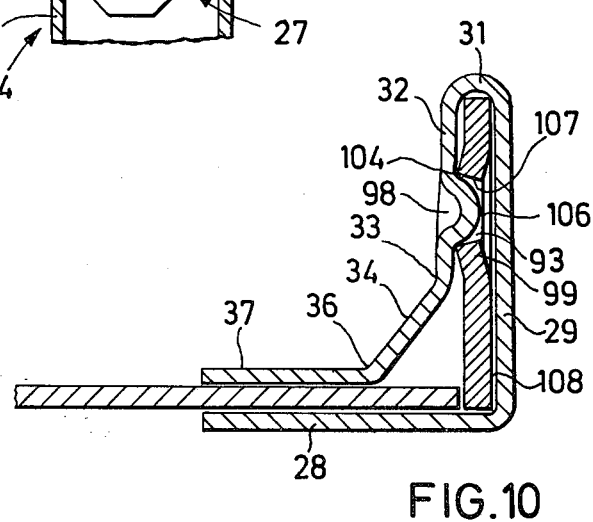

FIG. 1 of the drawings illustrates in diagrammatic, broken representation two partial air conditioning ducts, FIG. 2 shows a diagram of an elbow piece, FIG. 3 a section along the angle bisector through two corners with the bolt-nut connection in place, at greatly enlarged scale, FIG. 4 a plan view of an elbow piece pursuant to a second typical design, FIG. 5 view of the elbow pursuant to FIG. 4 in the direction of arrow A, FIG. 6 a washer for a third typical design, FIG. 7 a section similar to FIG. 3 through a third typical design, FIG. 8 a section through a fourth typical design, FIG. 9 a plan view of an elbow pursuant to a fifth typical design at a scale of 1 : 1, FIG. 10 a section along the line 10—10 in FIG. 9.

Since the two air conditioning ducts 11 and 12 are mirror-inverted symmetrical, only the duct illustrated in FIG. 1 on the right is exactly described in the following: The duct consists of two side walls 14 and 13, an upper wall 16 and a bottom wall not shown here. The upper wall 16 is connected by way of a channel 17 with the side wall 13, while the upper wall 16 is connected with the side wall 14 by means of a channel 18.

Four frame pieces are arranged around the left end 23 with the legs 24 and 26 illustrated in the drawing. Each of the frame pieces consists of a straight area 28, an area 29 joined to the latter on the left and pointing towards an outward direction, a curvature 31, and an area 32 pointing inward and running parallel with the area 29, followed about half-way up after a kink 33 by an area 34 joining at an incline with an angle of less than 45°. After an additional kink 36 the latter is followed by an area 37 which rests on the outer surface of the air conditioning duct. In the unfinished assembly state, an opening between the areas 37 and 28 permits insertion of the end 23 into the frame piece. The area 28, the upper wall 16 and the area 37 are solidly in contact at that point making it feasible to spot weld the points 38 and thus to connect the frame pieces 26 with the upper wall 16. The same applies, of course, with respect to the other frame pieces.

A massive metal elbow 39 is inserted with one of its legs 41 into the cavity 27 adjoining the areas 29 and 32. The other leg 42 is fitted into the respective cavity of the frame piece 24. The area 29, leg 41 and the area 32 are in snug proximity to each other, preventing undesirable deformation when shaping tools are used.

A bore 44 is provided in the elbow 39, which is flush with a respective bore of an adjacent elbow 46. The latter belongs to a flange connection 47. A seal 48 formed to fit properly into space is located between the flange connection 19 and the flange connection 47. As in the remaining three elbow pairs, a bolt is inserted through the elbows 39, 46 and tightened.

The elbow 39 with its legs 41, 42 is identical in width with the vertical part of the cavity 27, i.e., it extends from the curvature 31 to the area 28. Behind a step 56, 57 the outer front surfaces 53, 54 of the legs 41, 42 are shifted inward exactly by the amount corresponding to the shape of curvature 31 and the width of the metal in this area, so that the curvature 31, when seen in outline from the outside, is flush with the areas 58 and 59 which remained in their original position.

In the visible area 62 shown in FIG. 2, the elbow has been pressed backward from the plane of projection to a degree corresponding to the width of the material in the area 29, with the result that the backside of the center plate 63 is flush with the area 29 and lies approximately in the same plane.

Both of the elbows 39, 46 have nose 64 which is projecting several millimeters in the direction of the sealing plane 66. This nose 64 is positioned symmetrically to the angle bisector 67 in the outer corner area of the center plate 63.

At its bottom the nose 64 exhibits a contact surface 68. This contact surface 68 is outside of the area located under the bolt head 69, as well as outside of the area under the nut 71.

When the bolts are tightened, the frame pieces show a tendency to move towards each other in the direction of the arrows 72, 73. This tendency increases with the distance of the viewed position from the contact surface 68. This stress tendency remains also when the nose 64 yields somewhat. At any rate, the contact pressure is equalized by this measure over the length of the frame pieces to such a degree that the initially mentioned steps become completely unnecessary.

These advantages are obtained here free of charge, for whether an elbow has been shaped out to a greater or lesser degree, has no bearing on the price.

In the preferred typical design, the noses 64 abut on their contact surfaces 68. As a consequence, each of the noses requires only one-half the height of the effective height necessary. However, the noses 64 may be shaped also with such a distance from the angle bisector 67, that each nose 64 strikes against the adjacent center plate 63.

In addition, an interlocking effect is also attained. In this case, however, the nose 64 must be double the size (height) of that in the preferred typical design. In both cases, left and right elbow pieces are unnecessary.

It is also possible to provide a nose 64 only on one elbow while the other elbow is designed as previously with a flat centerplate 63. In this case, however, care must be taken during assembly that an elbow with a nose and one without nose is used in each corner area. In this case, too, the nose must be shaped twice as high as in the typical design.

The closer the noses 64 approach the bolt heads 69 or, respectively, the nuts 71, the less is the effect. A nose located directly under these heads would be completely ineffective.

If the elbows 39, 46 are pressed against each other by bolt connections, as in the typical design, it is recommended to keep the bore 44 from coming too close to the outer circumference of the elbow so as to have sufficient width of material remaining between the bore 44 and the surfaces 58, 59.

A second variant is shown in FIGS. 4 and 5. The corner area 74 of the center plate 63 has simply been bent outward here with the result that its front tip provides a contact surface 68 even though it is only of small dimension. Nevertheless, level contact surfaces remain for the bolt and nut heads 69, 71. The creation of the nose 64 by embossing in lieu of bending, however, provides the advantage that the elbow material in this area obtains as a result also greater strength.

The third typical design departs from the one-piece construction. This design employs a washer 76 with a center bore 77. However, its frontal surfaces 78, 79 converge wedge-shaped. If the washer 76 is arranged correctly during assembly the result obtained is that as shown in FIG. 7. If the bolt connection is not tightened, the frame pieces will also exhibit a tendency to exert pressure along the direction of arrows 72, 73. The wedge-shape of washer 76 has been greatly exaggerated for the sake of elucidation. A substantially less wedge-shaped design will suffice. However, care must be taken in assembly that the washer 76 is positioned correctly. If it were rotated pursuant to FIG. 7 by 180° the exact opposite effect would occur and a gradual worsening would take place in the intermediate positions. Besides, this typical design has the disadvantage that an additional part must be used. Already existing elbows without a nose can be used, however, and the benefits of the invention be enjoyed despite it.

The typical design pursuant to FIG. 8 employs only a short U-shaped clip 81 which is slipped onto the corner area. The width of the inner leg 82 corresponds here to the effective height. Care must be taken that the leg 82 does not extend directly to the area under the bolt-nut connection. The typical design pursuant to FIG. 6 and 7 is in this respect beyond critique. A proportionately shaped cap may be used in lieu of the clip 81. The width of the leg 82 must be designed in a way that the effective height will suffice for both frame pieces 24, 26. The leg 82 has therefore twice the width of the height of the nose 64.

It has been proven that the barely 4 mm elbow corner pieces described above will endure the occurring bending moment. However, elbows with a width reduced by more than 30 percent and thus of a material of about 3 mm in width may also be used. Pursuant to FIG. 9, reference is made subsequently to the fifth typical design. This elbow 39 exhibits also two legs 41 and 42 connected with each other by means of a center piece 86 resting on the same level. The elbow 39 exhibits furthermore the center plate 63 embossed in a downward direction as well as the nose 64 connected with the center plate 63 and embossed downwards. The center plate 63 which also exhibits a bore 44 does not project into the corner 87 of the center part 86 but it overlaps almost half the width of the legs 41, 42 whereby its inner edge 85 has an approximately arc-shaped design. The center plate 63 has been embossed to a degree corresponding to the width of the material in the area 29. Adjoining to the center plate 63 is the center part 86 which projects by means of a step beyond the legs 41, 42 by more than the width of the sheet metal. The corner 87 of the centerpart 86 has been designed in arc-shape.

Pursuant to FIG. 9 the elbow 39 exhibits a bulge 88, or respectively, a reinforcing seam depending whether the elbow 39 is viewed from above or from the rear. According to FIG. 9, the bulge 88 has been embossed from the center part 86 upward in a depth of approximately 1 mm. The bulge 88 is embossed adjoining the arc-shaped inner edge 85. Bulge 88 takes an approximately arc-shaped course and continues on in two short, straight sections. The bulge 88 has been arranged asymmetrically on the elbow 39.

FIG. 9 demonstrates further that the frontal surfaces of channel walls 13, 14, 16 and thus also the frontal surface of the channel 17 abut on the elbow 39 inside of bulge 88 and at a short distance from the latter. The area of the center part 86 located within the bulge 88 has been covered with a sealing mass 89, into which pushes the channel 17 along with the adjoining channel walls 13, 16. The bulge 88 reinforces in this manner not only the elbow 39 but it also delimits the sealing mass 89.

Two bores each 93, 94, 96, 97 are provided in the legs 41, 42, whereby the bores 93, 94 on the one hand, and 96, 97 on the other are paired. Each pair has the same distance from the respective curvature 31 and is arranged in such a way that it will be next to the area 32 in its assembled state. The diameter of the bores 93, 94, 96, 97 is about 7 mm. A leg has a width of 27 mm. The bore holes 93 – 97 weaken therefore the legs 41 – 42 only to a slight degree. On the other hand, they are sufficiently large proportioned to permit pressing of the area 32 into the bore holes 93 – 97 in the form of small cups 98. If the cups 98 were proportioned too small the connection between the elbows 39 and the frame pieces 24, 26 would not be sufficiently secure.

Concentric relief-embossings 99, 101, 102 and 103 are located around the bores 93 – 97. The relief-embossings are very flat and as a result the material surrounding the bore holes 93 – 97 is also condensed.

As a result of the relief-embossings 99, 103 the left edge of the bore 93, as shown in FIG. 10, becomes sharp by comparison. This sharpness can be increased even more, when the bore hole pursuant to FIG. 10 has been drilled from the right side. Due to the relief-embossing 99 and the resultant deformation, the inside edge 106 has a smaller diameter than the rim 104, and the bore wall 107 has a conical shape. The embossed edge 104 digs somewhat into the edge of cup 98 resulting in a still better connection than in the elbows 39 pursuant to FIGS. 2 and 4 where the edge of bores 93, 94, 96, 97 has not been relief-embossed.

FIG. 10 illustrates that the elbow 39 is thinner than the effective diameter between the area 32 and area 29. When the backside 108 abuts the area 29 only the rim 104 borders inside against the area 32. This has the advantage that the legs 41, 42 may be inserted with greater facility into the cavity 27. Sheet metal parts of this type always display a certain tolerance. It may occur for this reason that an elbow pursuant to FIGS. 2 and 4 is wider than the cavity 27 permits. In this case the elbow 39 must be driven in frequently with a hammer. The elbow pursuant to FIGS. 9 and 10 which is of thinner material fits however in any case into the cavity 27 and even with the most unfavorable tolerance — if the cavity 27 is undersized and the elbow 39 is oversized — the elbow 39 pursuant to FIGS. 9 and 10 may be inserted into the cavity 27 by hand, since only the edges 104 come into contact with the inside of area 32 and the jamming forces are therefore much reduced. The relief-embossing 99, 103 are acting furthermore as slide-on flanks, expanding the cavity 29 to some extent without the necessity of applying too much force.

As FIG. 9 shows the relief-embossed part 101 merges with the bulge 88 through a bridge 109 and in the same manner the relief-embossed part 102 merges with the bulge 88 by means of a transition piece 111, preventing the formation of pronounced kinks and attaining further reinforcement. The transition pieces 109, 111, when mounted, are located inside of the frame pieces 24, 26 and thus on the inside of area 32 up to the kink 33. This contributes to a still better form-locking connection between the elbow 39 and the frame pieces 26, 27.

The ratio of the leg width to leg diameter of the elbow is between approximately 1 : 1.5 and 1 : 3.7 and is preferably 1 : 2.6. The leg width in relation to the depth of the relief-embossings 99, 101, 102 and 103 is approximately 3 : 1.

What is claimed is:

1. A flange connection for rectangular air-conditioning ducts comprising
    flange means having four sheet metal frame members, said frame members having open hollow sections at the ends of said frame members and sealing surfaces between said open ends adapted to seal against their surface at a sealing plane,
    said flange means being adapted to be pushed on the free end of a duct and to be rigidly connected therewith,
    metal elbow means several millimeters in width having two legs and a central portion, with a corner area thereon, connected to said legs,
    said legs being inserted into the open hollow sections on adjacent ends of said frame members,
    said elbow means having spacer means in one piece therewith projecting from the corner area thereof in the direction of said sealing plane, of a material suitable to maintain an adequate effective height when subjected to contact pressures on said elbow means,
    the projecting height of said spacer means being adequate to space the corner of said elbow means from the sealing plane to cause the sealing surfaces on the frame members to press towards the sealing plane and maintain them in this position, under contact pressure on said elbow means.

2. A flange connection pursuant to claim 1 in which said spacer has an effective height of several millimeters.

3. A flange connection pursuant to claim 1 in which said spacer means comprises at least one nose means embossed from the corner area of an elbow means.

4. A flange connection pursuant to claim 3 in which said spacer means comprises a single nose which is located in the angle bisector of an elbow means.

5. A flange connection pursuant to claim 3 in which each nose means of each elbow means has identical height.

6. A flange connection pursuant to claim 3 in which said nose means are positioned to abut when the elbow means face each other.

7. A flange connection pursuant to claim 3 in which said nose means have such a position that the nose means abut on non-embossed areas of the other elbow means when the elbow means face each other.

8. A flange connection pursuant to claim 1 comprising bolt and nut means for fastening elbow means in faced relation to each other, in which said spacer means is located in an area essentially outside of the area which is directly below the bolt head or the nut.

9. A flange connection pursuant to claim 8 in which said spacer means is located in the extreme corner area of said central portion outside of said area.

10. A flange connection pursuant to claim 1 in which at least a portion of said central portion with its corner area has been embossed from that plane which is defined by the legs and the remainder of the central portion and the tip of the corner area is embossed from said central portion and forms said contact surface.

11. A flange connection pursuant to claim 1 in which said elbow means is seated practically free from play in the hollow section.

* * * * *